Figure 1:
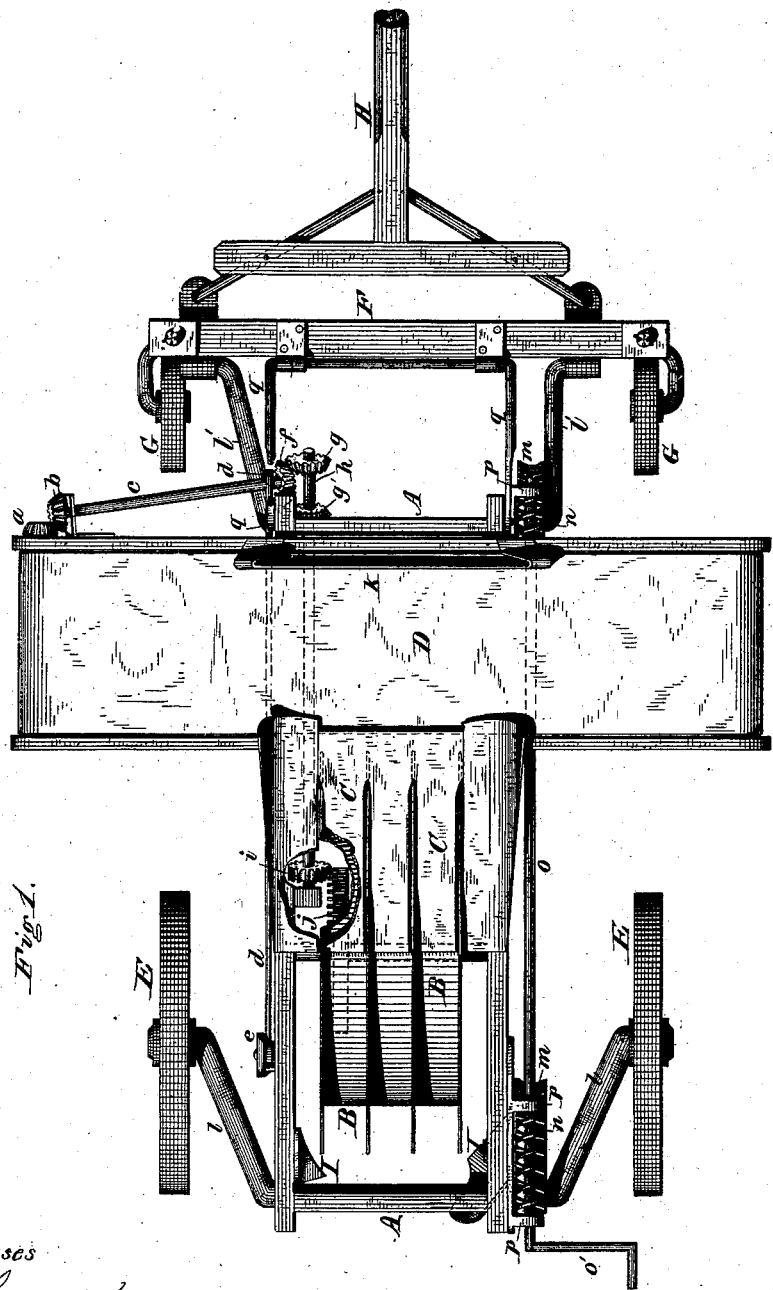

2 Sheets—Sheet 1.

M. J. AUSTIN.
Ditching-Machine.

No. 198,785. Patented Jan. 1, 1878.

Witnesses
Harry King
J. Wm Mister

Inventor.
Matthew J. Austin,
By his Attorneys,
Stansbury & Munn

2 Sheets—Sheet 2.
M. J. AUSTIN.
Ditching-Machine.
No. 198,785. Patented Jan. 1, 1878.
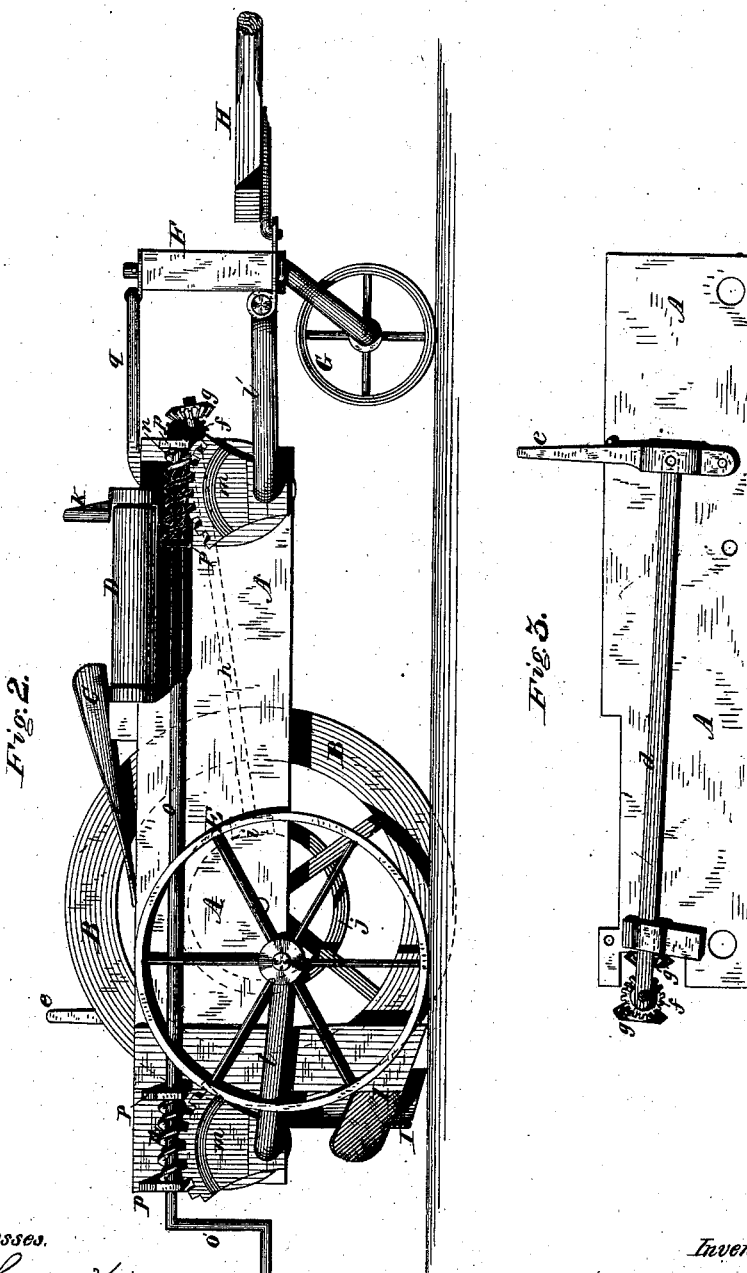

UNITED STATES PATENT OFFICE.

MATTHEW J. AUSTIN, OF BONHAM, TEXAS.

IMPROVEMENT IN DITCHING-MACHINES.

Specification forming part of Letters Patent No. 198,785, dated January 1, 1878; application filed November 22, 1877.

*To all whom it may concern:*

Be it known that I, MATTHEW J. AUSTIN, of Bonham, in the county of Fannin and State of Texas, have invented certain new and useful Improvements in Ditching-Machines; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1, Sheet 1, is a plan view of my improved ditching-machine. Fig. 2, Sheet 2, is a side elevation thereof, and Fig. 3 is a similar detached view of the same.

Corresponding parts in the several figures are denoted by like letters.

My invention consists in the employment, in connection with the ditching-wheel supporting-frame, of bent axles and arms having toothed segments, and a cranked bar or rod having worms or screws; and, secondly, in the employment, with an endless apron or carrier having one of its rollers provided with a gear-wheel or pinion, of a shaft and its gearing, a sliding bar, a lever, and a second shaft having gearing engaging with a gear-wheel upon the ditching wheel or wheels, substantially as hereinafter more particularly set forth.

The object of my invention is to easily and rapidly cut or excavate, on the surface of the ground, soil, clay, or soft stone, a ditch or trench of any reasonable width or depth suitable, and for the purpose of setting in pickets for making picket-fences, for laying pipes for water, gas, or other purposes, for drainage and culverts for agricultural, sanitary, or other purposes, and for grading roads.

In the annexed drawings, A marks a frame, within which is journaled the ditching or excavating wheels B B, consisting of a cylinder, provided upon its periphery with flanges or rings, two or more in number. The weight of the frame resting on the wheels sinks their flanges into the ground, and, as they revolve, the mass of earth thus pressed between said flanges is lifted, by friction and cohesion, to the top of the wheels, where it is thrown out from between flanges by scrapers C C, fastened in position so as to rest about horizontally and nearly at a tangent with the top of the wheels. The earth thus thrown out is received upon a transverse endless belt or apron, D, which conveys and drops it to one side of the ditch. The apron D envelops rollers bearing in side pieces secured upon the frame A. To one of these rollers is attached a beveled gear-wheel, $a$, with which engages a similar wheel, $b$, upon a shaft, $c$, bearing in one end of a sliding or shifting bar, $d$, operated by a lever, $e$, and confined to one side of the frame A in an eye or staple. The shaft $c$ is provided with a second gear-wheel, $f$, which is caused by shifting the lever $e$ to alternately engage with the pinions $g$ $g'$ upon a shaft, $h$, having a third pinion or gear-wheel, $i$, gearing with a toothed or gear-wheel, $j$, upon the axis of the wheels B B. By means of this mechanism the apron or carrier D is caused to move so as to drop its load to either side of the ditch at the option of the driver or attendant.

To prevent the earth, as it is thrown out from the ditching-wheels, rolling off the apron D, one of its side pieces is provided with a fender or board, $k$, disposed opposite the ditching-wheels.

The frame A is mounted or supported upon bent axles and arms $l$ $l'$ fastened in toothed segments $m$ $m$, gearing with screws or worms $n$ $n$ upon a rod, $o$, supported in bearings $p$ $p$ fastened to the side of the frame A. The rod $o$ is provided with a crank, $o'$, by turning which in the required direction the frame A will be raised or lowered, as may be desired. The axles $l$ $l$ are provided with wheels E E.

The arms $l'$ $l'$ are pivoted or hinged to the lower horizontal piece of an upright frame, F, its upper end being connected to the frame A by means of a pivoted frame or arms, $q$ $q$. This frame F is supported upon caster-wheels G G, the axes of which are swiveled in the said frame. The draft is applied at this end of the machine through a tongue, H.

I I are plows or cutters fastened to the frame A, and arranged so as to cut the ditch in rear of the ditching-wheels B B and widen the ditch. The loosened earth produced by the cutters or plows I I is taken up by the wheels B B upon the return of the machine.

I do not propose to cut the whole depth of the ditch at once passing over it, but to cut the full depth of the flanges of the wheels each time, passing back and forth until it is the required depth, or equal to one-half the diameter of the said wheels.

I claim—

1. In combination with the frame A the bent axles $l\ l$ and arms $l'\ l'$, provided with toothed segments $m\ m$ and rod $o$, having worms or screws $n\ n$ and crank or handle $o'$, substantially as and for the purpose set forth.

2. The endless apron or carrier D, having one of its rollers provided with a gear-wheel, $a$, in combination with the gear-wheel $b$, shaft $c$, sliding bar $d$, lever $e$, shaft $h$, having the gearing $g\ g'\ i$, and gear-wheel $j$ upon the ditching-wheels B, substantially as and for the purpose set forth.

In testimony that I claim the foregoing as my own invention I affix hereto my signature in presence of two witnesses.

MATTHEW JONES AUSTIN.

Witnesses:
J. A. PASCHAL,
H. G. EVANS.